United States Patent
Lee et al.

(10) Patent No.: US 8,110,641 B2
(45) Date of Patent: Feb. 7, 2012

(54) ANIONIC POLYMERIZATION METHOD FOR STYRENE DERIVATIVE CONTAINING PYRIDINE AS FUNCTIONAL GROUP

(75) Inventors: Jae-Suk Lee, Gwangju (KR); Nam-Goo Kang, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 464 days.

(21) Appl. No.: 12/335,693

(22) Filed: Dec. 16, 2008

(65) Prior Publication Data
US 2009/0203861 A1     Aug. 13, 2009

(30) Foreign Application Priority Data
Dec. 17, 2007   (KR) .......................... 10-2007-0132220

(51) Int. Cl.
*C08F 26/00*      (2006.01)

(52) U.S. Cl. ........................................ 526/263; 526/265
(58) Field of Classification Search ................. 526/264, 526/263, 265
See application file for complete search history.

(56) References Cited

U.S. PATENT DOCUMENTS 6,545,159 B2 *  4/2003  Lee et al. ...................... 546/348
6,660,821 B2 * 12/2003  Lee et al. ...................... 526/265

* cited by examiner

*Primary Examiner* — Edward Cain
(74) *Attorney, Agent, or Firm* — Occhiuti Rohlicek & Tsao LLP

(57) ABSTRACT

An anionic polymerization method for styrene derivative containing pyridine as functional group is provided. The method includes forming a complex of (vinylphenyl)-pyridine and lithium chloride and performing anionic polymerization. Accordingly, a polymer of styrene derivative containing pyridine can be obtained. The polymer has excellent optical properties, and its molecular weight and molecular weight distribution can be controlled.

24 Claims, 9 Drawing Sheets

ANIONIC POLYMERIZATION METHOD FOR STYRENE DERIVATIVE CONTAINING PYRIDINE AS FUNCTIONAL GROUP

CROSS-REFERENCE TO RELATED APPLICATION

This application claims the benefit of Korean Patent Application No. 2007-0132220, filed Dec. 17, 2007, the disclosure of which is hereby incorporated herein by reference in its entirety.

BACKGROUND OF THE INVENTION

1. Field of the Invention

The present invention relates to an anionic polymerization method for a styrene derivative containing pyridine as a functional group, and more particularly, to the anionic polymerization method in which molecular weight and molecular weight distribution can be controlled.

2. Description of the Related Art

Styrene-based monomers, unlike other monomers, are capable of being polymerized by radical, cationic or anionic polymerization due to a resonance effect of a phenyl group. Also, a synthesized polystyrene-based polymer can be modified to have various characteristics and is easily processed. Consequently, polystyrene-based monomers are being widely researched industrially and theoretically and are being commercialized.

However, in the anionic polymerization method for a styrene derivative, when the styrene derivative has a functional group such as a hydroxyl group, amine group or sulfur group, many side reactions occur during anionic polymerization due to high reactivity of an activated carbanion. Specifically, when a styrene derivative having an electron donor group as a functional group, such as —$CH_3$, —$OCH_3$, —$NH_2$, or —$N(CH_3)_2$, in a para position is polymerized by anionic polymerization, polymer yield becomes low or molecular weight and molecular weight distribution of the polymer cannot be controlled due to side reactions resulting from high carbanion reactivity.

To solve these problems, anionic polymerization methods for various styrene derivatives have been developed.

Anionic polymerization methods have been disclosed in Seiichi Nakahama and Akira Hirao, Prog. Polym. Sci., 1990, 15, 299; Akira Hirao, Surapich Loykulnant, Takashi Ishizone, Prog. Polym. Sci., 2002, 15, 299; T. Ishizone, G Uehara, A. Hirao and S. Nakahama, Macromolecules, 1998, 31, 3764; T. Ishizone, T. Utaka, Y. Ishino, A. Hirao and S. Nakahama, Macromolecules, 1997, 30, 6458; and T. Ishizone, G Uehara, A. Hirao, S. Nakahama and K. Tsuda, Macromolecules, 1998, 31, 3764. These methods include: modifying styrene-based monomers having an amine group, hydroxyl group, ketone group, carboxyl group or sulfur group at a para position with an appropriate protective group such as trimethylsilyl, t-butyldimethylsilyl, oxazoline or an ester compound, polymerizing the modified styrene-based monomer by anionic polymerization, and then releasing the protective group from the functional group.

Other anionic polymerization methods have been disclosed in Christian Schade, Macromol. Chem. Phys., 1999, 200, 621; Y. S. Cho, J. S. Lee, Macromol. Rapid Commun. 2001, 22, 8, 638; and R. P. Quirk and Y. Lee, J. Polm. Sci. Part A, 2000, 38, 145. In the methods, the anionic polymerization is performed after reducing the reactivity by forming a complex and coordinate covalent bond with an additive such as lithium chloride, diethyl zinc or dibutyl magnesium. However, in these conventional methods, it is difficult to completely remove impurities from solid monomers, resulting in reduction of activity of an initiator due to the remaining impurities in the solid monomers. In addition, since the anionic polymerization is generally performed at low temperature, solid monomers may have a problem of solubility.

Since a pyridine derivative is capable of forming a complex with various metallic compounds including ruthenium, iridium or platinum, it is widely applied in research on photoconductivity and organic electroluminescence devices.

As the prior art related to the pyridine derivative, Maria C. DeRosa, Derek J. Hodgson, Gary D. Enright, Brian Dawson, Christopher E. B. Evans, and Robert J. Crutchley, J. AM. CHEM. SOC., 2004, 126, 7619; Albertus J. Sandee, Charlotte K. Williams, Nicholas R. Evans, John E. Davies, Clare E. Boothby, Anna Kohler, Richard H. Friend, and Andrew B. Holmes, J. AM. CHEM. SOC., 2004, 126, 7041; M. A. Baldo, S. Lamansky, P. E. Burrows, M. E. Thompson, S. R. Forrest, Appl. Phys. Lett., 75, 4 (1999); Raymond C. Kwong, Sergey Lamansky, and Mark E. Thompson, Adv. Mater., 2000, 12, 1134; K. Dedeian, P. I. Djurovich, F. O. Garces, G Carlson, R. J. Watts, Inorg. Chem., 1991, 30, 1687-1688 disclose studies concerning an energy transfer phenomenon using an organic electroluminescence device to which a monomolecular complex synthesized of phenyl pyridine or a phenyl pyridine derivative with a metallic compound including iridium is applied. However, when such an organic electroluminescence device is formed using organic monomolecules, the organic monomolecules are decomposed due to heat generated in the device or are aggregated together.

In order to solve the problems of decomposition of the organic monomolecules due to heat generated in the device and aggregation of the organic monomolecules, a method of using a polymer of organic metal complex has been disclosed in Korean Patent No. 6660821. However, unlike the organic monomolecules having a uniform molecular weight, the polymer of organic metal complex synthesized by radical polymerization does not have a uniform molecular weight, resulting in a decrease in light emission efficiency.

The above-described anionic polymerization method for a styrene derivative and method of manufacturing an organic electroluminescence device using a pyridine derivative have several disadvantages.

SUMMARY OF THE INVENTION

The invention is provided an anionic polymerization method for styrene derivative containing pyridine as functional group.

The invention is also provided a block copolymerization method for a (vinylphenyl)-pyridine polymer and a second monomer.

The invention is also provided a block copolymerization method for a complex of (vinylphenyl)-pyridine with lithium chloride and a third monomer.

According to an embodiment, an anionic polymerization method includes forming a complex of (vinylphenyl)-pyridine and lithium chloride and performing anionic polymerization.

Here, the performing anionic polymerization may include initiating polymerization under a first condition polymerization by adding an s-butyllithium solution as an initiator to the complex of the (vinylphenyl)-pyridine and the lithium chloride to and performing the anionic polymerization under a second condition different from the first condition.

The first condition may be that temperature ranges from −80 to −70° C.

The second condition may be that temperature ranges from −50 to −40° and polymerization time ranges from 24 to 72 hours.

The forming the complex may use tetrahydrofuran as a solvent.

According to another embodiment, an anionic polymerization method includes initiating polymerization by adding cooled potassium-diphenylmethane (K-DPM) as an initiator to a (vinylphenyl)-pyridine monomer and performing anionic polymerization.

Here, the (vinylphenyl)-pyridine monomer may be dissolved in a solvent.

The solvent may be tetrahydrofuran.

A temperature for cooling the K-DPM initiator may range from −80 to −70° C.

A time for the anionic polymerization may range from 120 to 240 minutes.

According to still another embodiment, a block copolymerization method for a (vinylphenyl)-pyridine polymer and a second monomer, the method includes preparing the (vinylphenyl)-pyridine polymer by homopolymerizing a (vinylphenyl)-pyridine monomer and copolymerizing by adding the second monomer to the (vinylphenyl)-pyridine polymer.

Here, the second monomer may be vinylpyridine or methyl methacrylate.

The preparing the (vinylphenyl)-pyridine polymer may include initiating homopolymerization by adding a cooled K-DPM initiator to the (vinylphenyl)-pyridine monomer dissolved in a solvent and performing the homopolymerization.

The solvent may be tetrahydrofuran.

A temperature for cooling the K-DPM initiator may range from −80 to −70° C.

A temperature for copolymerizing the (vinylphenyl)-pyridine polymer with the second monomer may range from −80 to −70° C.

A time for copolymerizing the (vinylphenyl)-pyridine polymer with the second monomer may range from 120 to 240 minutes.

According to yet another embodiment, A block copolymerization method for a complex of (vinylphenyl)-pyridine with lithium chloride and a third monomer, the method includes adding s-butyllithium as an initiator to the third monomer in a tetrahydrofuran solvent, adding lithium chloride to the third monomer and performing copolymerization by adding the complex of (vinylphenyl)-pyridine with lithium chloride to the third monomer.

Here, the third monomer may be styrene or isoprene.

The adding of the s-butyllithium as the initiator to the third monomer in the tetrahydrofuran solvent may be performed at a temperature ranging from −80 to −70° C.

The performing copolymerization may be performed at a temperature ranging from −50 to −40° C.

The performing copolymerization may be performed during a time ranging from 48 to 96 hours.

BRIEF DESCRIPTION OF THE DRAWINGS

These and/or other objects, aspects and advantages of the invention will become apparent and more readily appreciated from the following description of exemplary embodiments, taken in conjunction with the accompanying drawings of which.

DETAILED DESCRIPTION OF THE INVENTION

Figure 1:
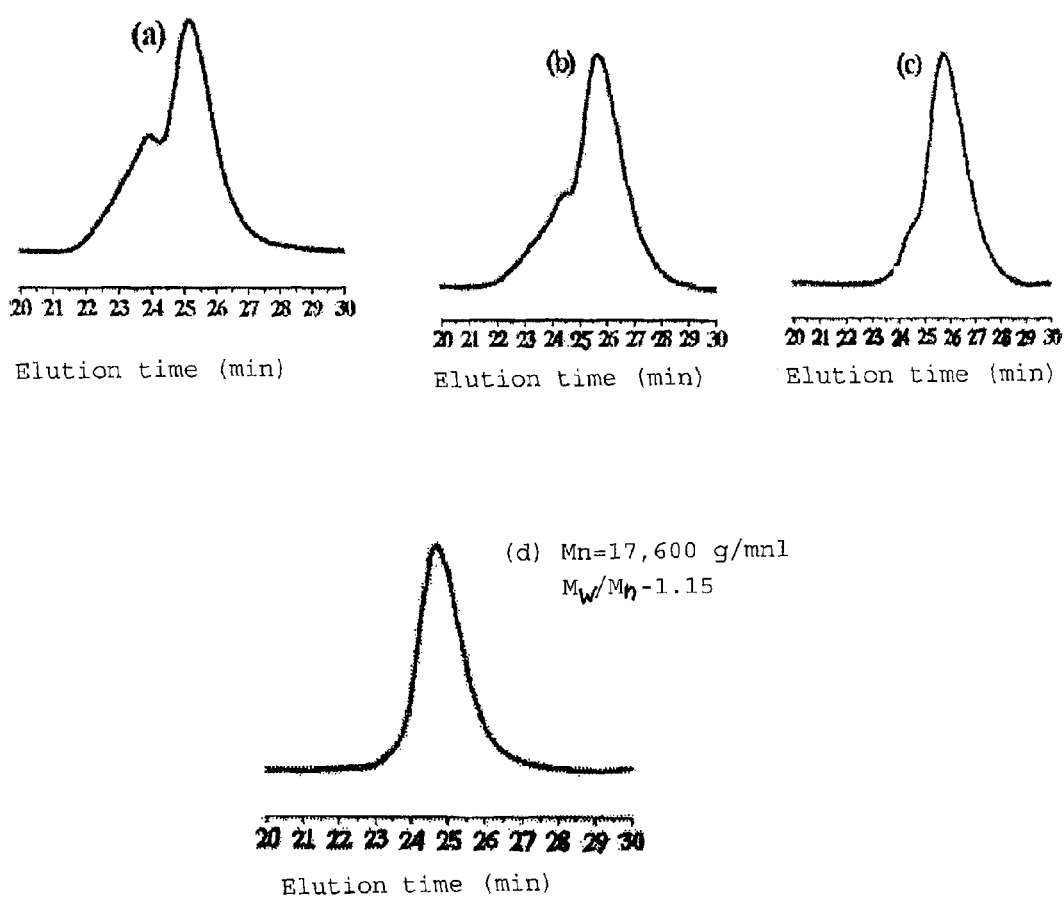
FIG. 1 shows a GPC (Gel Permeation Chromatography) spectrum of poly(2-(4-vinylphenyl)pyridine)

Reference will now be made in detail to exemplary embodiments of the present invention, examples of which are shown in the accompanying drawings.

However, it should be understood that the present invention is not limited to the described exemplary embodiments, but includes various modifications, equivalents and alternatives.

In this description, the terms "first" and "second" may be used to distinguish similar elements from one another, however these terms should not be construed as limiting the elements in any way.

Hereinafter, exemplary embodiments of the present invention will be described in more detail with reference to the accompanying drawings. When the same element appears in different drawings, it will always be denoted by the same reference numeral and it will only be described once. It should be clear that these embodiments are provided only to explain the present invention, not to limit its scope.

EXAMPLE 1

An anionic polymerization method for a (vinylphenyl)-pyridine monomer represented by Formula I forming a complex with lithium chloride is represented by Reaction Scheme 1-a.

[Formula 1]

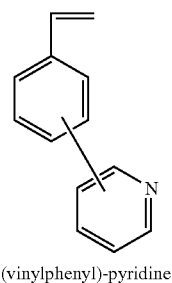

(vinylphenyl)-pyridine

[Reaction Scheme 1-a]

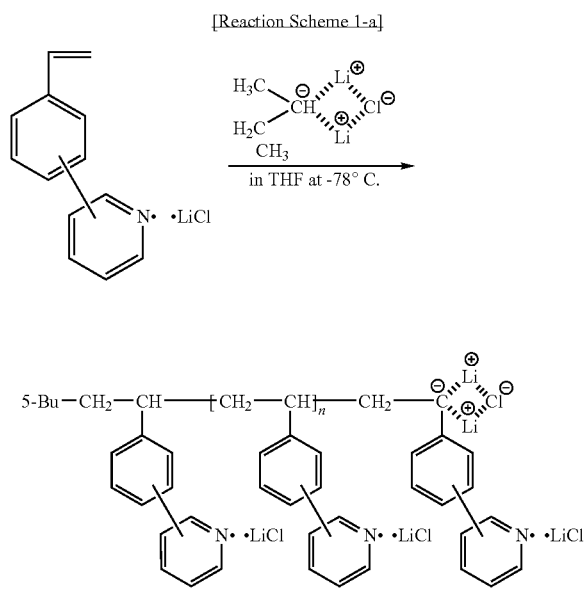

Here, n is the number of repeated (vinylphenyl)-pyridine monomers and ranges from tens to millions.

The anionic polymerization method for a (vinylphenyl)-pyridine monomer to which lithium chloride is added includes i) forming a complex of (vinylphenyl)-pyridine and lithium chloride using tetrahydrofuran (THF) as a solvent, ii) initiating polymerization under a first condition by adding an s-butyllithium solution as an initiator to the complex of the (vinylphenyl)-pyridine and the lithium chloride, and iii) performing the polymerization under a second condition different from the first condition.

The first condition under which initiating polymerization by adding the s-butyllithium solution as the initiator to the complex of the (vinylphenyl)-pyridine and the lithium chloride is performed may be that temperature ranges from −80 to −70° C. When the temperature is higher than −70° C., polymerization is not initiated, and when the temperature is lower than −80° C., the initiator is not activated.

All steps are performed in a glass apparatus under high vacuum.

EXPERIMENTAL EXAMPLE 1

Preparation of Homopolymer of poly(2-(4-vinylphenyl)pyridine) using Lithium Chloride Complexes of (vinylphenyl)-pyridine and lithium chloride were prepared with various content ratios of 2-(4-vinylphenyl)pyridine to lithium chloride shown in Table 1 in a glass apparatus under high vacuum. At this time, tetrahydrofuran (THF) was used as a solvent.

An s-butyllithium solution was added as an initiator to the (vinylphenyl)-pyridine monomers forming a complex with lithium chloride, polymerization was initiated under a first condition, and then polymerization was carried out under a second condition, that is, at various temperatures and for various periods of time for each run according to Table 1.

After that, methanol was added to terminate the reaction and then removed by filtration. The polymerized product was dissolved in benzyne, filtered to remove lithium chloride and freeze-dried, thereby obtaining the final product polymer.

In Table 1, s-BuLi is s-butyllithium, and VPPy is 2-(4-vinylphenyl)pyridine. In addition, I is a temperature of the first condition which is an initiation condition, P is a temperature of the second conduction which is a polymerization condition, and Time is a polymerization time of the second condition which also is a polymerization condition. $Mn^a$ is a theoretical value of number average molecular weight, $Mn^b$ is an actual experimental value of the number average molecular weight, and Mw is a theoretical value of weight average molecular weight.

From the results in Table 1, it can be noted that when lithium chloride (LiCl) is not added, yield of the final product is not high and molecular weight and molecular weight distribution of the final product cannot be controlled. This is because a side reaction like the mechanism represented by Reaction Scheme 1-b may occur when the additive LiCl is not added.

From the results in Table 1, it can also be noted that for 100% yield, the polymerization time may be 24 to 72 hours. When the polymerization time is less than 24 hours, polymerization is not sufficiently carried out, and when the polymerization time is more than 72 hours, polymerization is completed before the polymerization time elapses.

The polymerization temperature may be −40 to −50° C. When the temperature is lower than −50° C., there is insufficient activation energy for polymerization, and when the temperature is higher than −40° C., there is excess energy.

TABLE 1

[Reaction Scheme 1-b]

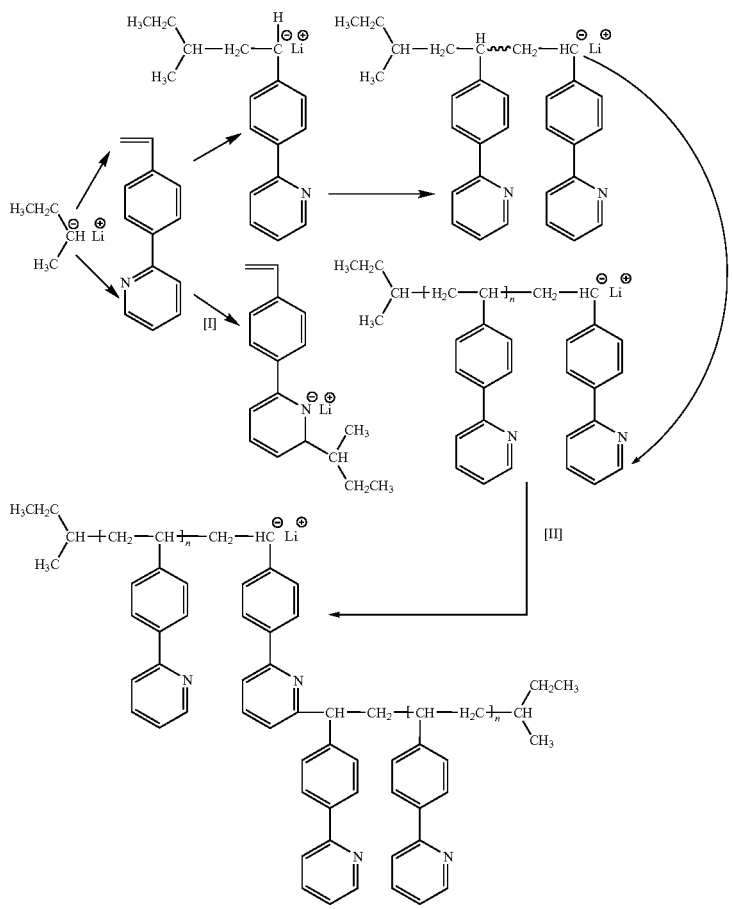

| Run | Initiator mmol | LiCl mmol | VPPy/LiCl mmol | Temp °C I | Temp °C p | Time hr | Mn × 10⁻³ calcd[a] | Mn × 10⁻³ obsd[b] | $M_w/M_n$[b] | Yield of Polymers, % |
|---|---|---|---|---|---|---|---|---|---|---|
| | K-Naph | | | | | | | | | |
| 01 | 0.137 | 0 | 2.618/0 | −78 | −78 | 1 | 1.5 | 32.6 | 16.1 | 22 |
| | s-BuLi | | | | | | | | | |
| 02 | 0.072 | 0 | 2.60/0 | −78 | −78 | 1 | 0.8 | 22.4 | 13.7 | 13 |
| 03 | 0.028 | 0.076 | 2.55/0 | −78 | −45 | 6 | 4.29 | 4.16 | 1.22 | 26.0 |
| 04 | 0.035 | 0.103 | 2.42/0 | −78 | −45 | 12 | 7.95 | 8.02 | 1.46 | 63.6 |
| 05 | 0.040 | 0.076 | 2.84/0 | −78 | −45 | 24 | 12.7 | 15.4 | 1.54 | 100 |
| 06 | 0.039 | — | 2.96/2.97 | −78 | −45 | 12 | 7.7 | 5.7 | 2.84 | 55.6 |
| 07 | 0.039 | — | 2.92/2.93 | −78 | −45 | 72 | 13.7 | 29.8 | 2.13 | 100 |
| 08 | 0.039 | 0.085 | 2.60/0.69 | −78 | −45 | 72 | 12.0 | 16.8 | 1.42 | 100 |
| 09 | 0.044 | 0.083 | 3.04/1.96 | −78 | −45 | 72 | 12.6 | 11.3 | 1.47 | 100 |
| 10 | 0.040 | 0.080 | 2.39/2.16 | −78 | −45 | 72 | 10.7 | 9.9 | 1.22 | 100 |
| 11 | 0.031 | 0.091 | 2.96/4.14 | −78 | −45 | 72 | 17.3 | 17.6 | 1.15 | 100 |

EXPERIMENTAL EXAMPLE 2

Test of Controlling Molecular Weight and Molecular Weight Distribution of poly(2-(4-vinylphenyl)pyridine) According to Lithium Chloride Concentration Change FIG. 1 shows a GPC spectrum of poly(2-(4-vinylphenyl)pyridine).

Referring to FIG. 1, each of the poly(2-(4-vinylphenyl)pyridine) was prepared according to the following description.

TABLE 2

| | VPPy:LiCl | | | |
|---|---|---|---|---|
| | a | b | c | d |
| | 1:0.26 | 1:0.64 | 1:0.9 | 1:1.4 |

Complexes of 2-(4-vinylphenyl)pyridine (VPPy) and lithium chloride (LiCl) were prepared with various content ratios of VPPy to LiCl shown in Table 2. At this time, THF was used as a solvent.

An s-butyllithium solution was added as an initiator to the (vinylphenyl)-pyridine monomers forming a complex with lithium chloride, thereby initiating polymerization at −78° C., and then polymerization was carried out under a second condition, that is, at −45° C. for 72 hours.

After that, methanol was added to terminate the reaction and then removed by filtration. The polymerized product was dissolved in benzyne, filtered to remove lithium chloride and freeze-dried, thereby obtaining the final product polymer. The final product polymer was the poly(2-(4-vinylphenyl) pyridine).

Molecular weight and molecular weight distribution of the obtained final product polymer according to change in elution time were estimated and the results are shown in FIG. 1.

Referring to FIG. 1, it can be confirmed that the results are controlled as the LiCl content is increased.

EXPERIMENTAL EXAMPLE 3

Measurement of Properties of Polymerized poly(2-(4-vinylphenyl)pyridine)

Poly(2-(4-vinylphenyl)pyridine) polymerized according to Experimental Example 2 was analyzed by $^1$H-NMR, 13C-NMR, FT-IR, DSC and TGA, and the results are shown in FIGS. 2 to 6, respectively.

Figure 2:
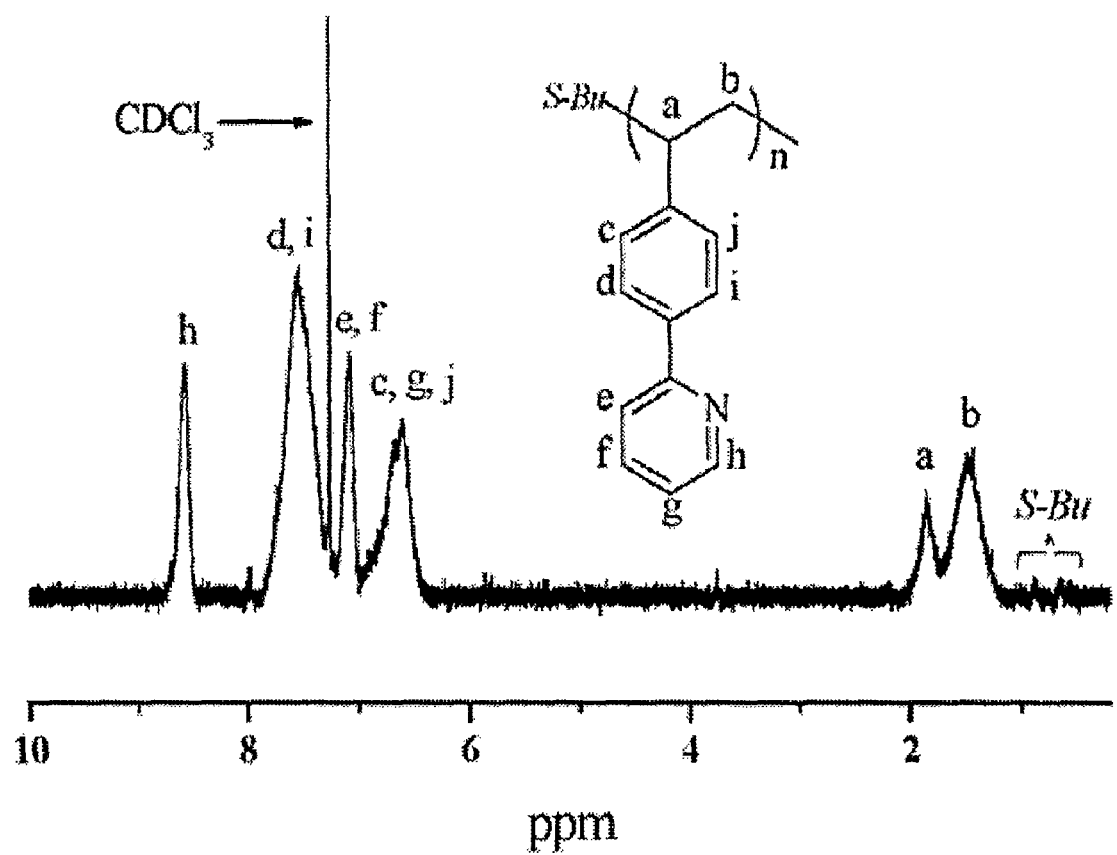
FIG. 2 shows a $^1$H-NMR (Nuclear Magnetic Resonance) spectrum of poly(2-(4-vinylphenyl)pyridine)
Figure 3:
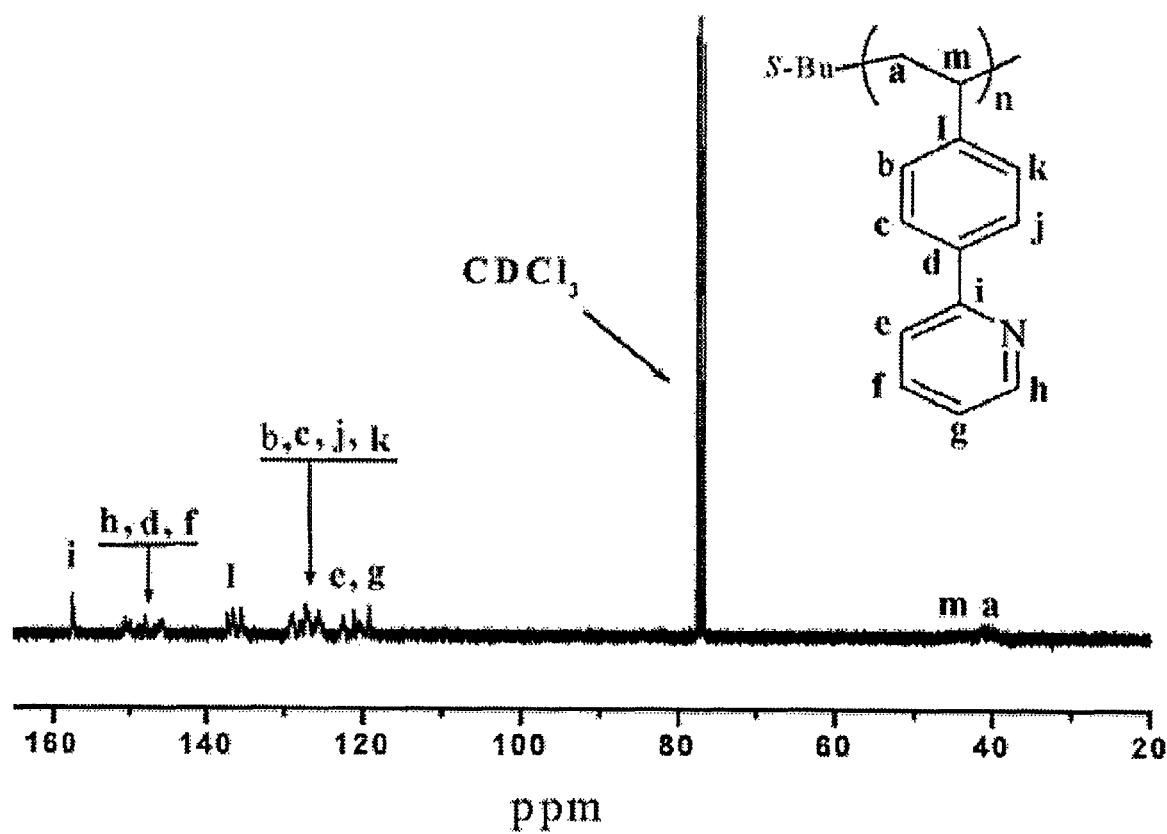
FIG. 3 shows a $^{13}$C-NMR spectrum of poly(2-(4-vinylphenyl)pyridine)
Figure 4:
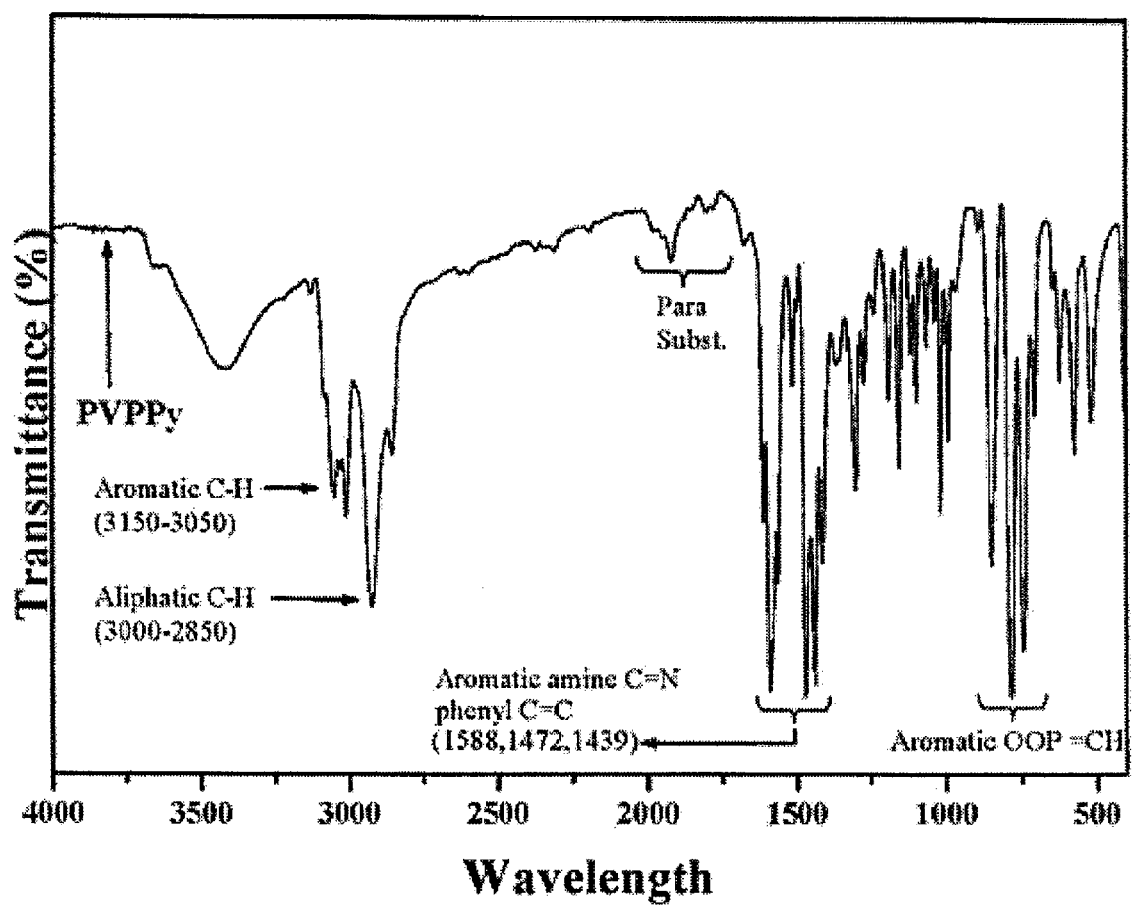
FIG. 4 shows an FT-IR (Fourier Transform Infrared Spectroscopy) spectrum of poly(2-(4-vinylphenyl)pyridine)
Figure 5:
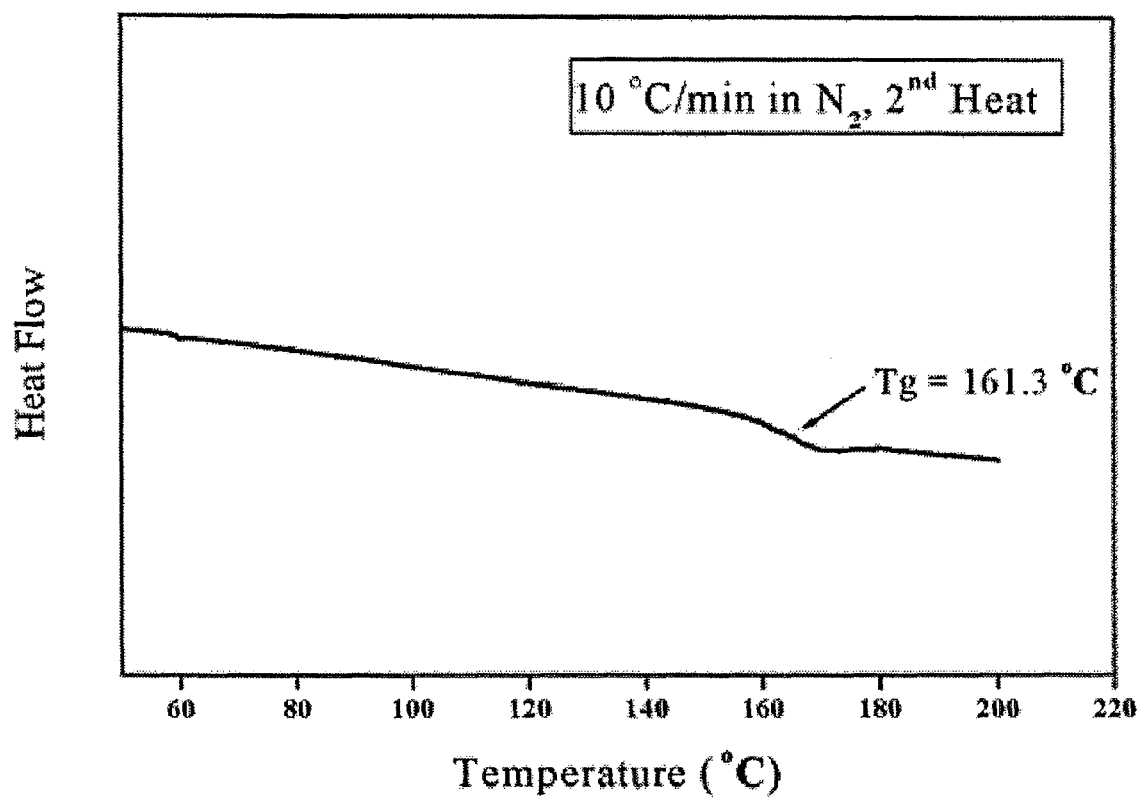
FIG. 5 shows a DSC (Differential Scanning Calorimeter) spectrum of poly(2-(4-vinylphenyl)pyridine)
Figure 6:
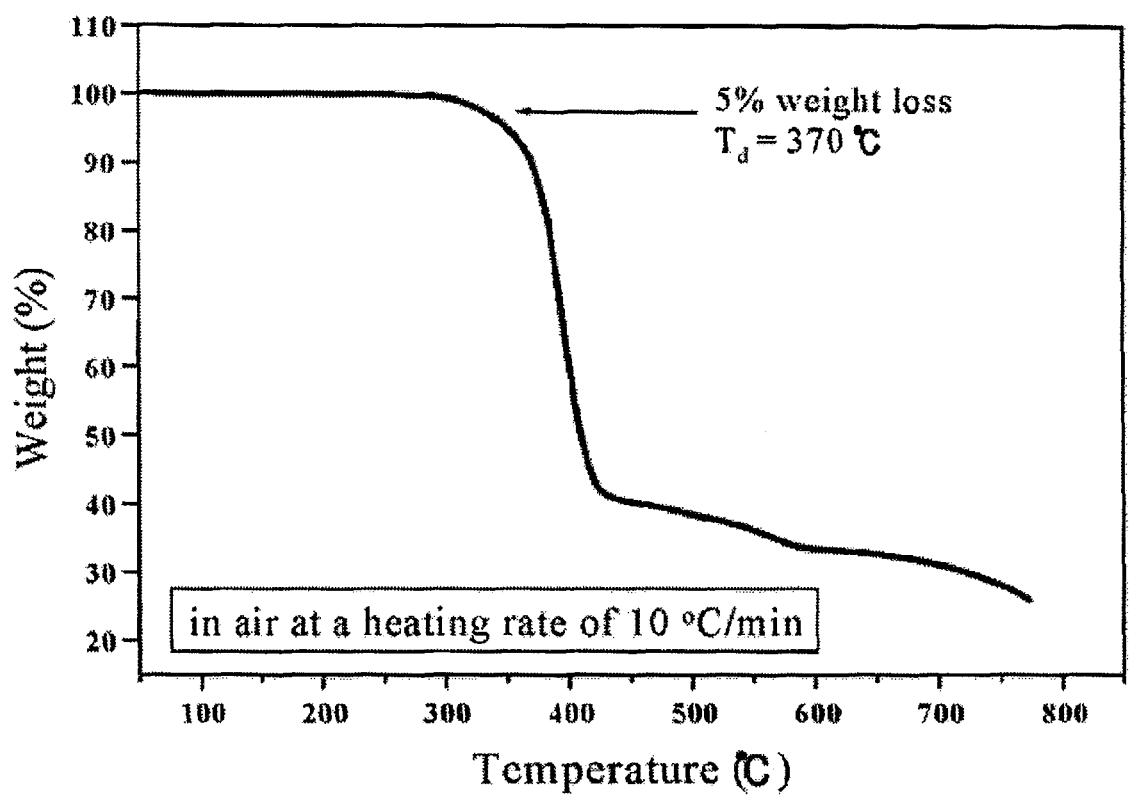
FIG. 6 shows a TGA (ThermoGravimetric analysis) spectrum of poly(2-(4-vinylphenyl)pyridine)

FIG. 2 shows a $^1$H-NMR spectrum of poly(2-(4-vinylphenyl)pyridine), FIG. 3 shows a $^{13}$C-NMR spectrum of poly(2-(4-vinylphenyl)pyridine), FIG. 4 shows an FT-IR spectrum of poly(2-(4-vinylphenyl)pyridine), FIG. 5 shows a DSC spectrum of poly(2-(4-vinylphenyl)pyridine) and FIG. 6 shows a TGA spectrum of poly(2-(4-vinylphenyl)pyridine).

Referring to FIGS. 2 to 4, it can be confirmed that the material is poly(2-(4-vinylphenyl)pyridine). Referring to FIGS. 5 and 6, the material is very thermally stable since it has a glass transition temperature (Tg) of 161.3° C. and a phase separation temperature (Td) of 370° C.

EXAMPLE 2

An anionic polymerization method for a (vinylphenyl)-pyridine monomer using potassium-diphenylmethane (K-DPM) as an initiator is represented by the following Reaction Scheme 2.

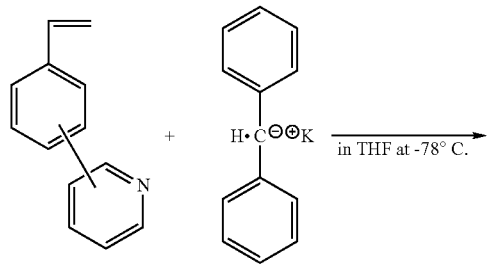

[Reaction Scheme 2]

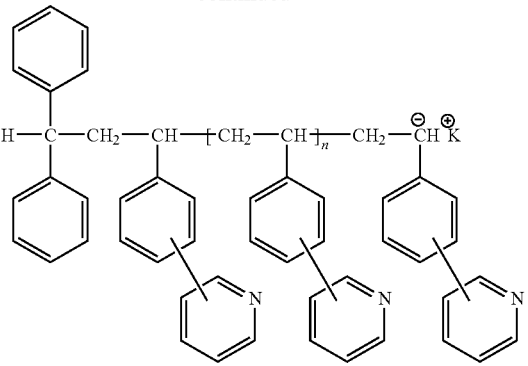

Here, n is the number of repeated (vinylphenyl)-pyridine monomers and ranges from tens to millions.

The anionic polymerization method for a (vinylphenyl)-pyridine monomer using K-DPM as an initiator, represented by Reaction Scheme 2, includes: i) dissolving (vinylphenyl)-pyridine in a THF solvent; ii) cooling a K-DPM initiator; iii) initiating polymerization by adding the K-DPM initiator to the (vinylphenyl)-pyridine monomer dissolved in the THF solvent; and iv) performing the polymerization of the (vinylphenyl)-pyridine monomer added the initiator and dissolved in the THF solvent.

Here, a temperature for cooling the K-DPM initiator may be −80 to −70° C. When the temperature is higher than −70° C., the reaction is not properly initiated, and when the temperature is lower than −80° C., the initiator is not activated.

All reactions are carried out in a glass apparatus under high vacuum.

EXPERIMENTAL EXAMPLE 4

Preparation of poly(2-(4-vinylphenyl)pyridine) using K-DPM Initiator According to Changes in Polymerization Time and Temperature Predetermined amounts (refer to Table 3) of 2-(4-vinylphenyl)pyridine were dissolved in a THF solvent.

A K-DPM initiator was cooled to −78° C. and then added to the 2-(4-vinylphenyl)pyridine dissolved in a THF solvent according to a predetermined concentration (refer to Table 3). Polymerization was carried out at various temperatures and for various periods of time listed in Table 3.

After that, methanol was added to terminate the reaction and then removed by filtration. The polymerized product was dissolved in benzyne and then freeze-dried, thereby obtaining the final product polymer.

In Table 3, K-DPM is potassium-diphenylmethane, and VPPy is 2-(4-vinylphenyl)pyridine. In addition, I is a temperature of an initiation condition, P is a temperature of a polymerization condition, and Time is a time of the polymerization condition. $Mn^a$ is a theoretical value of number average molecular weight, $Mn^b$ is an actual experimental value of the number average molecular weight, and Mw is a theoretical value of weight average molecular weight.

According to the results listed in Table 3, while polymerization of styrene or a styrene derivative was not generally initiated by a K-DPM initiator, polymerization of 2-(4-vinylphenyl)pyridine was initiated by the K-DPM initiator. It can be also noted from these results that anionic polymerization is possible to perform without using an additive preventing a side reaction.

The polymerization time when K-DPM initiator was used was 120 to 240 minutes, which is less than for anionic polymerization using LiCl/s-BuLi. When the polymerization time is less than 120 minutes, polymerization is not sufficiently performed, and when the polymerization time is more than 240 minutes, polymerization is completed before the polymerization time elapses.

TABLE 3

| K-D PM mmol | VPPy mmol | Temp °C. I | Temp °C. P | Time min | Mn × 10⁻³ calcd[a] | Mn × 10⁻³ obsd[b] | $M_w/M_n$[b] | Yield of Polymers, % |
|---|---|---|---|---|---|---|---|---|
| 0.0167 | 2.94 | −78 | −78 | 30 | 15.0 | 15.8 | 1.04 | 47.2 |
| 0.0171 | 2.97 | −78 | −78 | 90 | 22.1 | 20.4 | 1.04 | 70.3 |
| 0:0410 | 3.58 | −78 | −78 | 120 | 14.6 | 15.6 | 1.10 | 92.0 |
| 0.0174 | 3.08 | −78 | −78 | 150 | 32.0 | 32.2 | 1.04 | 100 |
| 0.0200 | 3.31 | −78 | −78 | 150 | 29.9 | 30.2 | 1.05 | 100 |
| 0.0197 | 3.28 | −45 | −45 | 150 | 30.1 | 30.6 | 1.10 | 100 |
| 0.0187 | 3.34 | −78 | −45 | 150 | 32.3 | 37.1 | 1.09 | 100 |
| 0.0416 | 2.69 | −78 | −78 | 150 | 11.7 | 11.9 | 1.06 | 100 |
| 0.0323 | 3.59 | −78 | −78 | 150 | 20.1 | 18.9 | 1.06 | 100 |
| 0.0269 | 4.25 | −78 | −78 | 150 | 28.7 | 29.2 | 1.04 | 100 |
| 0.0160 | 5.59 | −78 | −78 | 150 | 63.4 | 64.5 | 1.04 | 100 |

EXPERIMENTAL EXAMPLE 5

Test of Controlling Molecular Weight and Molecular Weight Distribution of poly(2-(4-vinylphenyl)pyridine)

Figure 7:
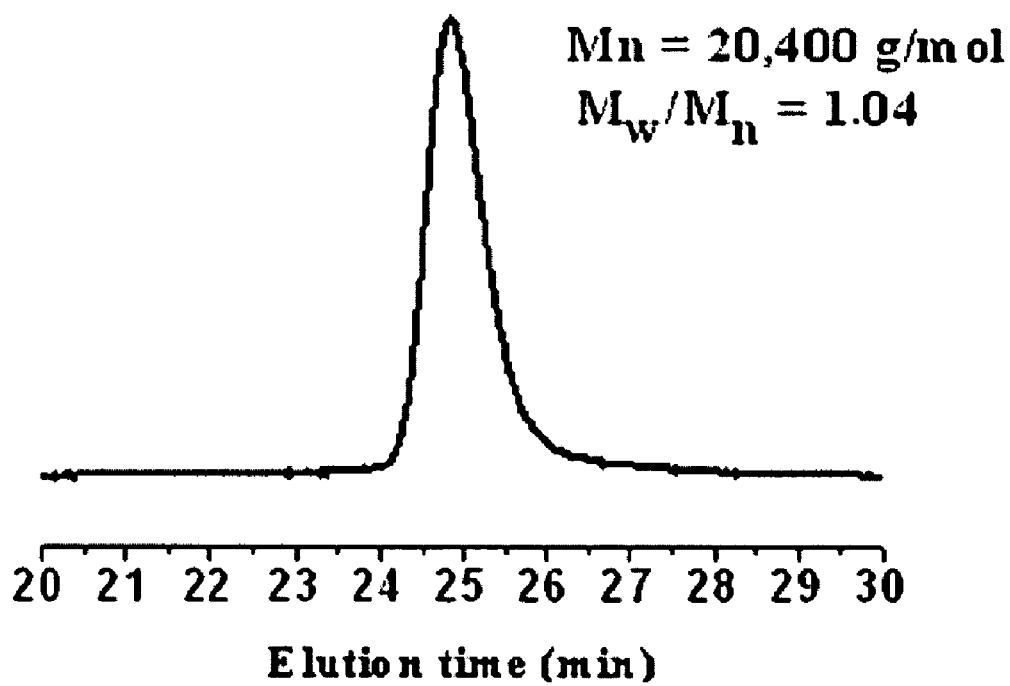
FIG. 7 shows a GPC spectrum of poly(2-(4-vinylphenyl)pyridine) using potassium-diphenylmethane (K-DPM)

FIG. 7 shows a GPC spectrum of poly(2-(4-vinylphenyl)pyridine) using K-DPM. The poly(2-(4-vinylphenyl)pyridine) was prepared according to the following description.

A K-DPM initiator was cooled to −78° C. and then added to the 2-(4-vinylphenyl)pyridine dissolved in a THF solvent. Polymerization was carried out at −78° C. for 30 to 150 minutes. After that, methanol was added to terminate the reaction and then removed by filtration. The polymerized product was dissolved in benzyne and then freeze-dried, thereby obtaining the final product polymer. The final product polymer was the poly(2-(4-vinylphenyl)pyridine).

Molecular weight and molecular weight distribution of the obtained final product polymer according to change in elution time were estimated and the results are shown in FIG. 7.

EXPERIMENTAL EXAMPLE 6

Confirmation of Molecular Weight Change in poly(2-(4-vinylphenyl)pyridine)

Figure 8:
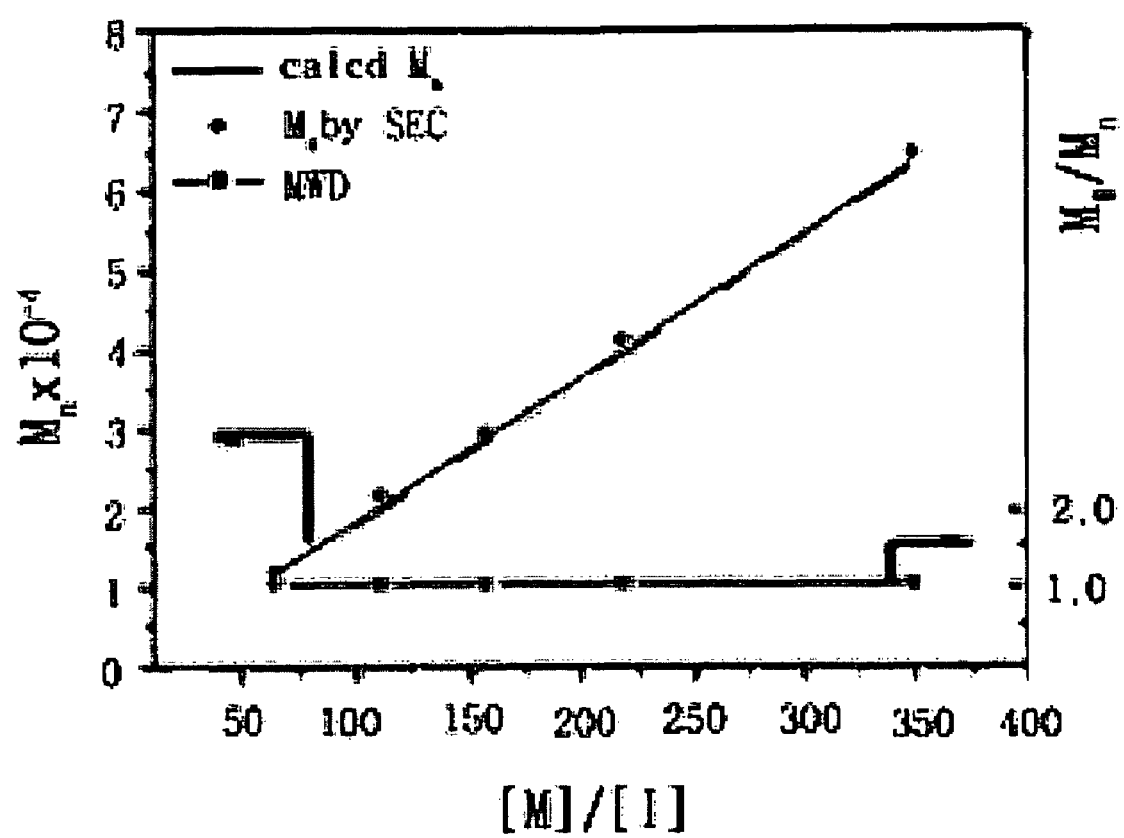
FIG. 8 shows a result of the experiment of confirmation of molecular weight change in poly(2-(4-vinylphenyl)pyridine)

In order to confirm a living nature of controlled molecular weight and molecular weight distribution, 2-(4-vinylphenyl)pyridine using K-DPM according to Experimental Example 3 was analyzed to check if there was an increase in molecular weight. FIG. 8 shows a result of the experiment of confirmation of molecular weight change in poly(2-(4-vinylphenyl)pyridine).

Referring to FIG. 8, it can be confirmed that an estimated molecular weight corresponds to a molecular weight analyzed by GPC.

EXAMPLE 3

A block copolymerization method for a (vinylphenyl)-pyridine polymer and a second monomer (R) using K-DPM as an initiator is represented by the following Reaction Scheme 3.

[Reaction Scheme 3]

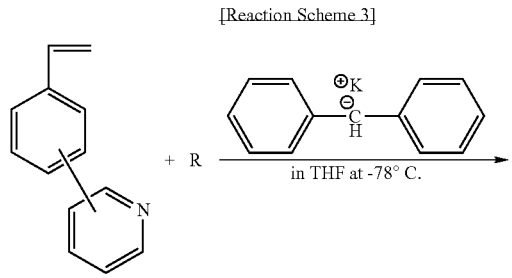

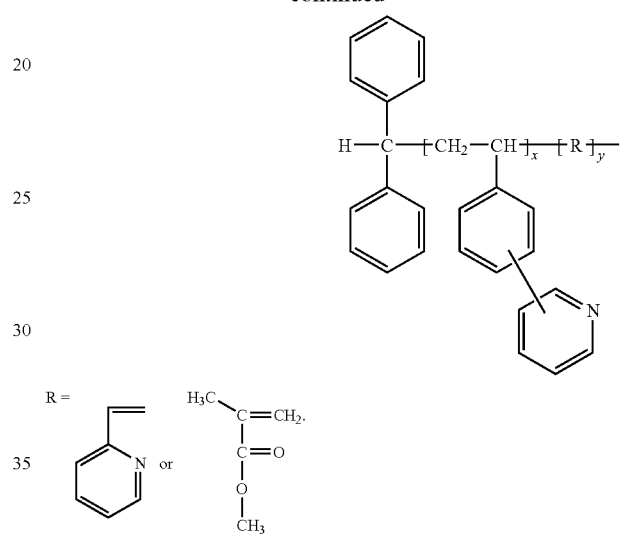

Here, the second monomer (R) is vinyl-pyridine or methyl methacrylate.

According to Reaction Scheme 3, when vinylpyridine is used as the second monomer (R), the reaction is carried out like the following Reaction Scheme 3-a, and when methyl methacrylate is used as the second monomer, the reaction is carried out like the following Reaction Scheme 3-b.

[Reaction Scheme 3-a]

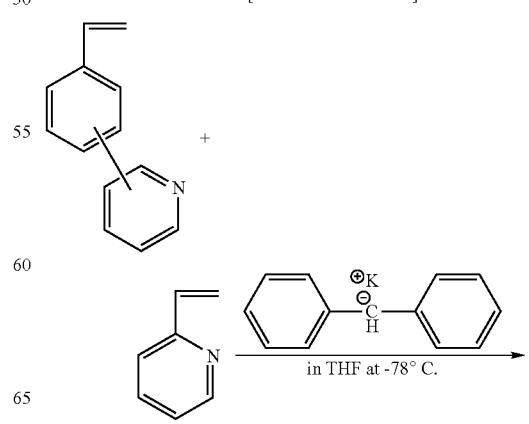

-continued

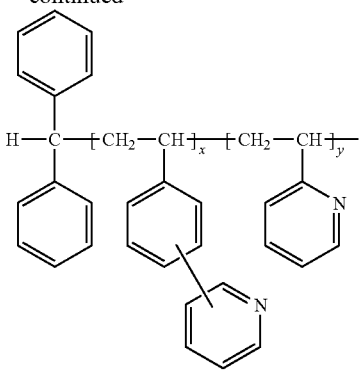

[Reaction Scheme 3-b]

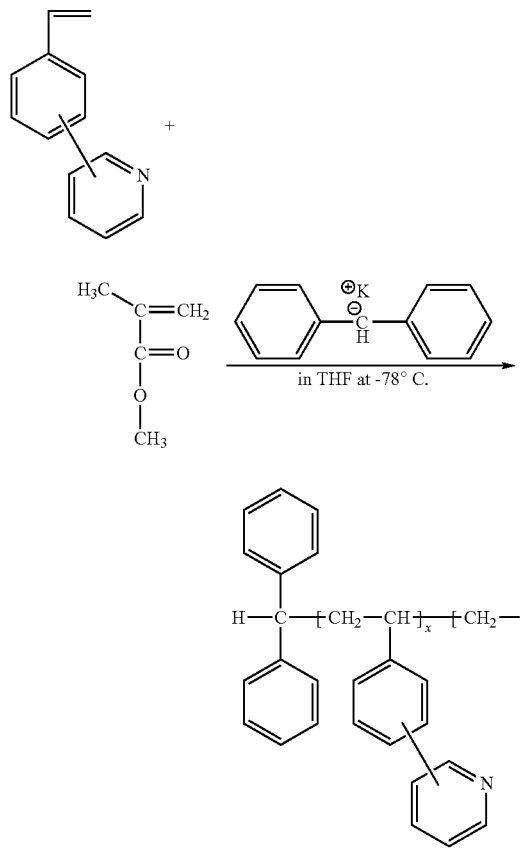

In Reaction Schemes 3, 3-a and 3-b, x is the number of repeated (vinylphenyl)-pyridine monomers, y is the number of repeated second monomers, and each of x and y ranges from tens to millions.

The block copolymerization method for a (vinylphenyl)-pyridine polymer and a second monomer using K-DPM as an initiator includes: i) homopolymerizing (vinylphenyl)-pyridine monomers; and ii) copolymerizing by adding a second monomer to the homopolymerized vinyl-phenyl pyridine polymer.

The homopolymerization of the (vinylphenyl)-pyridine monomers includes: i) dissolving the vinylpyridine monomers in a THF solvent; ii) cooling a K-DPM initiator; iii) initiating the homopolymerization by adding the cooled initiator to the (vinylphenyl)-pyridine monomers dissolved in the THF solvent; and iv) performing the polymerization of the (vinylphenyl)-pyridine monomers added the initiator and dissolved in the THF solvent.

Here, a temperature for cooling the K-DPM initiator may be −80 to −70° C.

When the temperature is higher than −70° C., the reaction is not properly initiated, and when the temperature is lower than −80° C., the initiator is not activated.

Here, a temperature at which the homopolymerized (vinylphenyl)-pyridine polymer is copolymerized with the second monomer may be −80 to −70° C. When the temperature is lower than −80° C., there is insufficient activation energy for copolymerization, and when the temperature is higher than −70° C., the copolymer is not stable.

Here, copolymerization of the homopolymerized (vinylphenyl)-pyridine polymer with the second monomer may be performed for 120 to 240 minutes. When the copolymerization time is less than 120 minutes, copolymerization is not sufficiently performed, and when the copolymerization time is more than 240 minutes, copolymerization is completed before the time elapses.

EXPERIMENTAL EXAMPLE 7

Preparation of Block Copolymer of 2-(4-vinylphenyl)pyridine with Vinyl-pyridine or Methyl Methacrylate Homopolymers of 2-(4-vinylphenyl)pyridine were synthesized according to Example 2, and some of them were recovered. A second monomer such as vinylpyridine or methyl methacrylate were added at −78° C. and reacted with the recovered polymers for 180 minutes, thereby obtaining the block copolymer. The results are shown in Table 4.

In Table 4, VPPy is 2-(4-vinylphenyl)pyridine, VP is vinylphenyl, and MMA is methyl methacrylate. Time is a block copolymerization time. $Mn^a$ is a theoretical value of number average molecular weight, $Mn^b$ is an actual experimental value of the number average molecular weight, and Mw is a theoretical value of weight average molecular weight. $^d f_{VPPy}$ is a volume ratio of 2-(4-vinylphenyl)pyridine to the copolymer of 2-(4-vinylphenyl)pyridine and the second monomer.

Referring to Table 4, it can be noted that molecular weight and molecular weight distribution are easily controlled.

Figure 9:
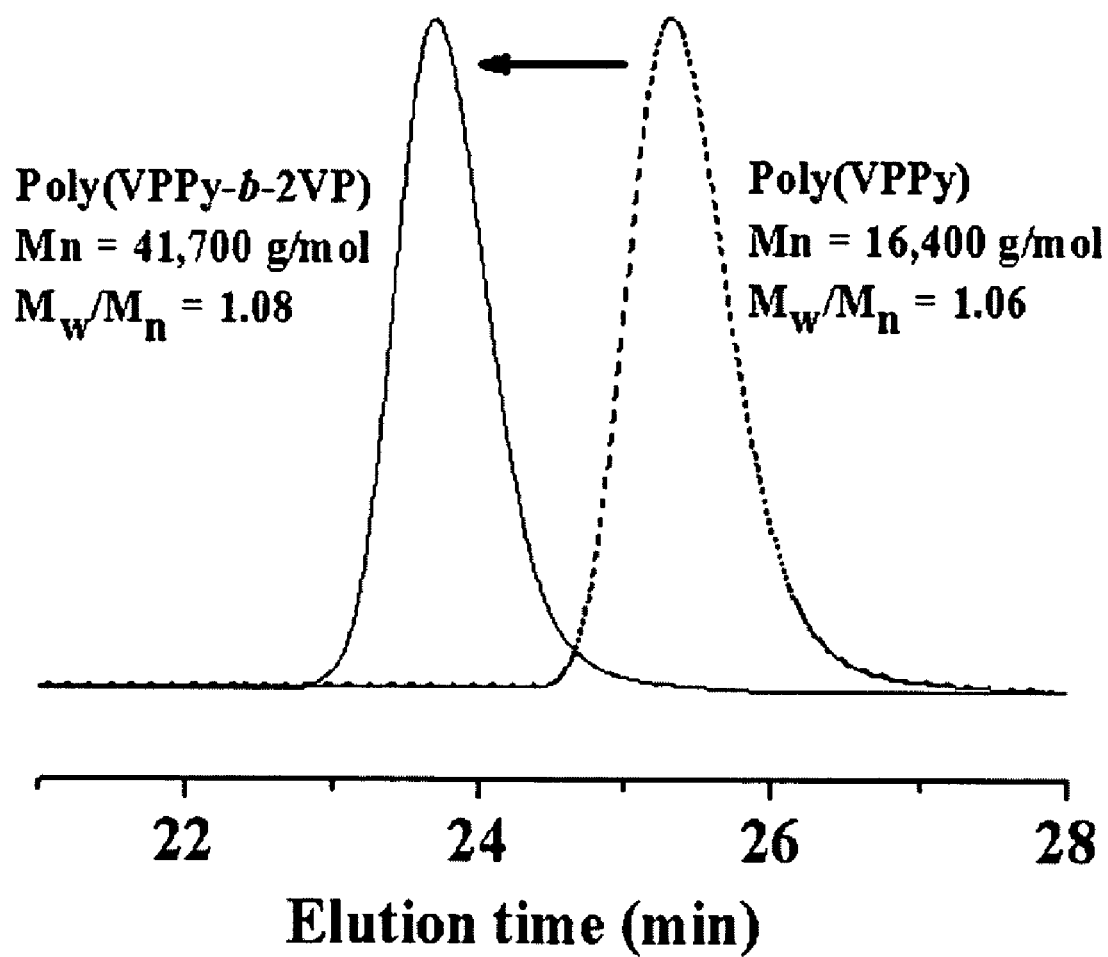
FIG. 9 shows a GPC spectrum of poly(2-(4-vinylphenyl)pyridine-b-2-vinylpyridine).

FIG. 9 shows a GPC spectrum of poly(2-(4-vinylphenyl)pyridine-b-2-vinylpyridine).

Referring to FIG. 9, a change in molecular weight and molecular weight distribution of the copolymer of VPPy and VP, compared to the homopolymer of VPPy, is shown according to change in elution time. From FIG. 9, it can be noted that block copolymerization is completed.

TABLE 4

| 1st monomer Mmol | 2nd monomer mmol | time min | $M_n'10^{-3}$ calcd[a] | obsd[b] | $M_w/M_n$[b] | Yield of block[d] copolymer, % | $f_{VPPy}$ |
|---|---|---|---|---|---|---|---|
| VPPy | 2VP | | | | | | |
| 3.53 | 5.16 | 180 | 40.2(16.3) | 41.7(16.4) | 1.08(1.06) | 100 | 0.41 |
| 9.49 | 1.52 | 180 | 40.6(37.0) | 40.0(37.2) | 1.07(1.07) | 99 | 0.86 |
| VPPy | MMA | | | | | | |
| 1.85 | 5.55 | 180 | 44.4(16.7) | 45.6(16.2) | 1.04(1.09) | 99 | 0.25 |
| 3.04 | 3.29 | 180 | 36.1(22.6) | 36.0(22.9) | 1.10(1.08) | 98 | 0.48 |
| 6.99 | 2.16 | 180 | 47.8(40.8) | 47.7(41.0) | 1.09(1.07) | 99 | 0.76 |

EXAMPLE 4

A block copolymerization method for a complex of (vinylphenyl)-pyridine with lithium chloride and a third monomer is represented by the following Reaction Scheme 4.

[Reaction Scheme 4]

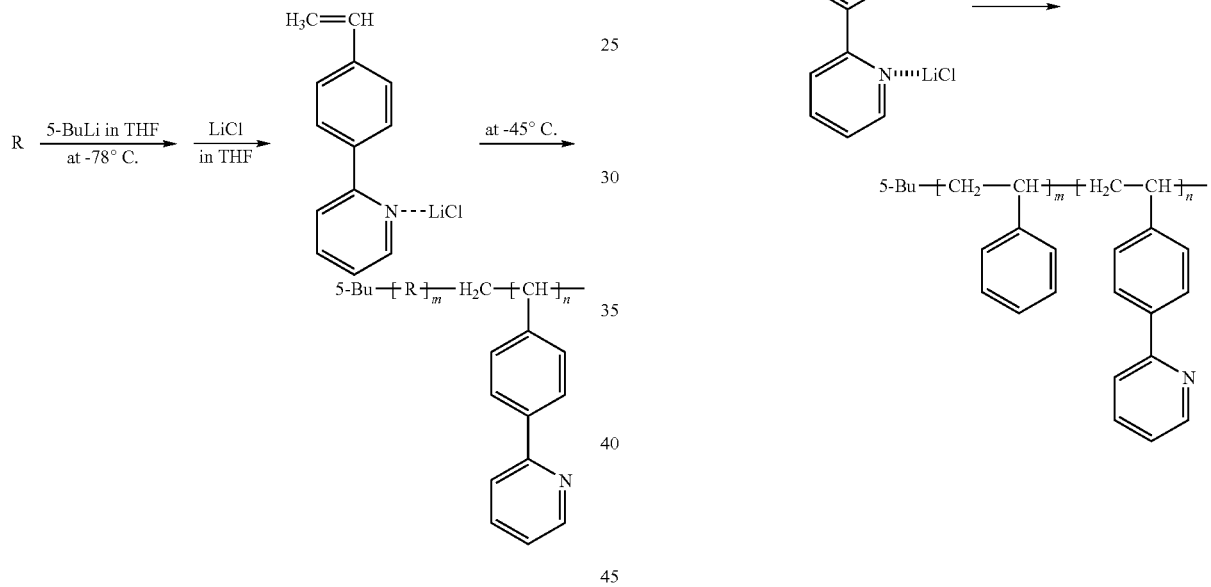

Here, the third monomer (R) is styrene or isoprene.

When styrene is used as the third monomer, the reaction is carried out like Reaction Scheme 4-a, and when isoprene is used as the third monomer, the reaction is carried out like Reaction Scheme 4-b.

[Reaction Scheme 4-a]

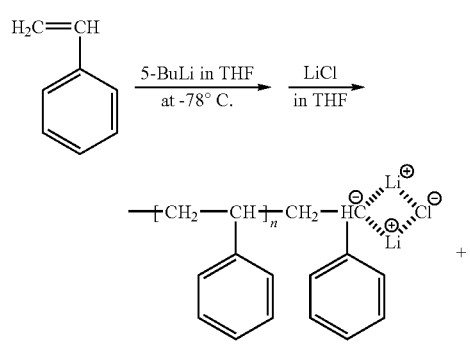

[Reaction Scheme 4-b]

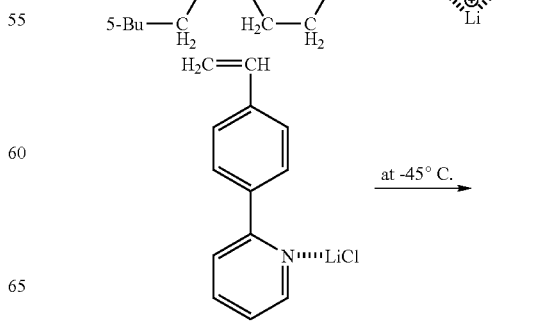

-continued

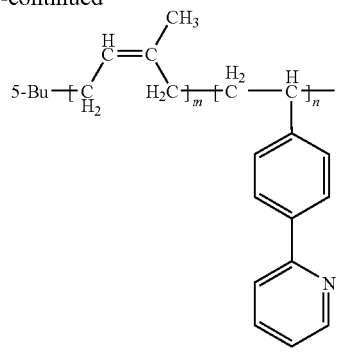

In Reaction Schemes 4, 4-a and 4-b, n is the number of repeated (vinylphenyl)-pyridine monomers, m is the number of repeated third monomers, and each of m and n ranges from tens to millions.

The block copolymerization method for a complex of (vinylphenyl)-pyridine with lithium chloride and a third monomer includes: i) adding s-butyllithium as an initiator to the third monomer in a THF solvent; ii) adding lithium chloride dissolved in the THF solvent to the third monomer prepared in step i); and iii) performing copolymerization by adding the complex of (vinylphenyl)-pyridine monomer with lithium chloride to the third monomer prepared in step ii).

Here, for step i), a temperature may be −80 to −70° C. When the temperature is higher than −70° C., the reaction is not initiated, and when the temperature is lower than −80° C., the initiator is not activated.

For step iii), a temperature may be −50 to −40° C. When the temperature is lower than −50° C., there is insufficient activation energy, and when the temperature is higher than −40° C., the copolymer is not stable.

The time for step iii) may be 48 to 96 hours. When the time is less than 48 hours, block copolymerization is not sufficiently carried out, and when the time is more than 96 hours, block copolymerization is completed before the time elapses.

EXPERIMENTAL EXAMPLE 8

Preparation of Block Copolymer of 2-(4-vinyl-phenyl)pyridine with Styrene or Isoprene An s-butyllithium initiator was cooled to −78° C. and then added to a styrene monomer or isoprene monomer in a THF solvent. After that, lithium chloride dissolved in the THF solvent was added thereto. A complex of 2-(4-vinyl-phenyl)pyridine monomer with lithium chloride in the THF solvent was added and reacted with the styrene monomer or isoprene monomer as described above at −45° C. for 72 hours, thereby preparing a block copolymer.

In Table 5, Temp is a temperature for block copolymerization and Time is a time for block copolymerization. $Mn^a$ is a theoretical value of number average molecular weight, $Mn^b$ is an actual experimental value of the number average molecular weight, and Mw is a theoretical value of weight average molecular weight.

From the results in Table 5, it can be noted that molecular weight and molecular weight distribution of the block copolymer are controlled.

TABLE 5

| s-BuLi | monomer | LiCl | VPPy/LiCl | Temp | Time | $Mn \times 10^{-3}$ | | | Yield |
|---|---|---|---|---|---|---|---|---|---|
| mmol | mmol | mmol | mmol | °C. | hr | calcd$^a$ | obsd$^b$ | $M_w/M_n^b$ | (%) |
| Styrene | | | | | | | | | |
| 0.137 | 7.23 | 0.29 | 3.72/5.51 | −45 | 72 | 10.4 | 11.1 | 1.09 | 100 |
| 0.046 | 7.44 | 0.33 | 1.62/3.06 | −45 | 72 | 23.2 | 23.8 | 1.06 | 100 |
| Isoprene | | | | | | | | | |
| 0.052 | 10.11 | 0.38 | 4.05/5.99 | −45 | 72 | 30.1 | 30.7 | 1.11 | 100 |
| 0.038 | 6.94 | 0.24 | 1.81/2.87 | −45 | 72 | 23.8 | 23.5 | 1.09 | 100 |

Accordingly, a styrene derivative containing pyridine as a functional group can be polymerized by reducing activity of carbanion, thereby preparing a polymer having excellent optical properties. Thus, molecular weight and molecular weight distribution of the polymer can be easily controlled.

While exemplary embodiments of the present invention have been shown and described, it will be appreciated by those skilled in the art that various changes can be made to the described exemplary embodiments without departing from the spirit and scope of the invention defined by the claims and their equivalents.

What is claimed is:

1. An anionic polymerization method for styrene derivative containing pyridine as fuctional group, the anionic polymerization method comprising:

forming a complex of (vinylphenyl)-pyridine and lithium chloride; and performing anionic polymerization according to Reaction Scheme 1.

[Reaction Scheme 1]

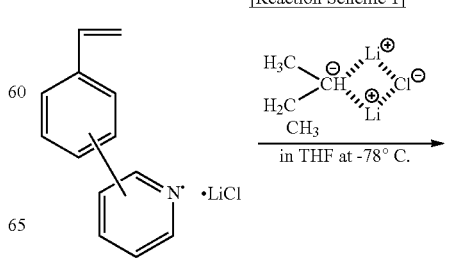

-continued

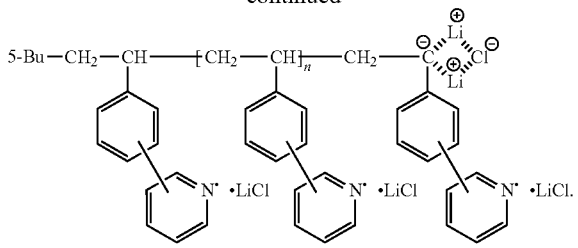

2. The method according to claim 1, wherein the performing anionic polymerization comprises:
 initiating polymerization under a first condition by adding an s-butyllithium solution as an initiator to the complex of the (vinylphenyl)-pyridine and the lithium chloride; and
 performing the anionic polymerization under a second condition different from the first condition.

3. The method according to claim 2, wherein the first condition is that temperature ranges from −80 to −70° C.

4. The method according to claim 2, wherein the second condition is that temperature ranges from −50 to −40° C. and polymerization time ranges from 24 to 72 hours.

5. The method according to claim 1, wherein n shown in the Reaction Scheme 1 is any number ranging from tens to millions.

6. The method according to claim 1, wherein the forming the complex uses tetrahydrofuran as a solvent.

7. An anionic polymerization method for styrene derivative containing pyridine as fuctional group, the anionic polymerization method comprising:
 initiating polymerization by adding cooled potassium-diphenylmethane (K-DPM) as an initiator to a (vinylphenyl)-pyridine monomer; and
 performing anionic polymerization according to Reaction Scheme 2

8. The method according to claim 7, wherein the (vinylphenyl)-pyridine monomer is dissolved in a solvent.

9. The method according to claim 8, wherein the solvent is tetrahydrofuran.

10. The method according to claim 7, wherein a temperature for cooling the K-DPM initiator ranges from −80 to −70° C.

11. The method according to claim 7, wherein a time for the anionic polymerization ranges from 120 to 240 minutes.

12. The method according to claim 7, wherein n shown in the Reaction Scheme 2 is any number ranging from tens to millions.

13. A block copolymerization method for a (vinylphenyl)-pyridine polymer and a second monomer, the method comprising:
 preparing the (vinylphenyl)-pyridine polymer by homopolymerizing a (vinylphenyl)-pyridine monomer; and
 copolymerizing by adding the second monomer to the (vinylphenyl)-pyridine polymer according to Reaction Scheme 3,

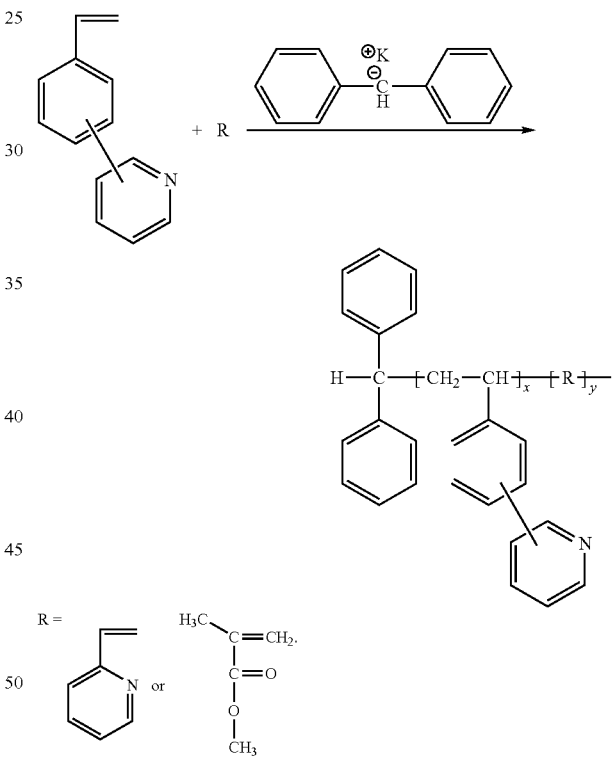

wherein the second monomer (R) is vinyl-pyridine or methyl methacrylate.

14. The method according to claim 13, wherein the preparing the (vinylphenyl)-pyridine polymer comprises:
 initiating homopolymerization by adding a cooled K-DPM initiator to the (vinylphenyl)-pyridine monomer dissolved in a solvent; and
 performing the homopolymerization.

15. The method according to claim 14, wherein the solvent is tetrahydrofuran.

16. The method according to claim 14, wherein a temperature for cooling the K-DPM initiator ranges from −80 to −70° C.

17. The method according to claim 13, wherein a temperature for copolymerizing the (vinylphenyl)-pyridine polymer with the second monomer ranges from −80 to −70° C.

18. The method according to claim 13, wherein a time for copolymerizing the (vinylphenyl)-pyridine polymer with the second monomer ranges from 120 to 240 minutes.

19. The method according to claim 13, wherein each of x and y shown in the Reaction Scheme 3 is any number ranging from tens to millions.

20. A block copolymerization method for a complex of (vinylphenyl)-pyridine with lithium chloride and a third monomer, the method comprising:
   adding s-butyllithium as an initiator to the third monomer in a tetrahydrofuran solvent;
   adding lithium chloride to the third monomer; and
   performing copolymerization by adding the complex of (vinylphenyl)-pyridine with lithium chloride to the third monomer according to Reaction Scheme 4,

[Reaction Scheme 4]

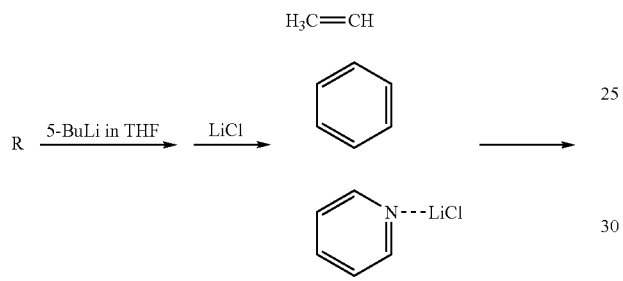

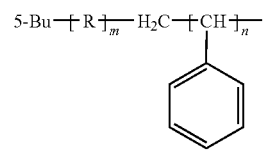

wherein the third monomer (R) is styrene or isoprene.

21. The method according to claim 20, wherein each of m and n shown in the Reaction Scheme 4 is any number ranging from tens to millions.

22. The method according to claim 20, wherein the adding of the s-butyllithium as the initiator to the third monomer in the tetrahydrofuran solvent is performed at a temperature ranging from −80 to −70° C.

23. The method according to claim 20, wherein the performing copolymerization is performed at a temperature ranging from −50 to −40° C.

24. The method according to claim 20, wherein the performing copolymerization is performed during a time ranging from 48 to 96 hours.

* * * * *